(12) United States Patent　　　(10) Patent No.:　US 12,664,379 B2

Paczkowski　　　　　　　　　　　(45) Date of Patent:　Jun. 23, 2026

(54) METHODS AND SYSTEMS FOR CONTROLLING ANTENNAS AND READER DEVICES

(71) Applicant: T-Mobile Innovations LLC, Overland Park, KS (US)

(72) Inventor: Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 12 days.

(21) Appl. No.: 18/817,019

(22) Filed: Aug. 27, 2024

(65) Prior Publication Data

US 2026/0065001 A1　　Mar. 5, 2026

(51) Int. Cl.
　　　*H01Q 1/22*　　　　　(2006.01)
　　　*G06K 7/10*　　　　　(2006.01)
(52) U.S. Cl.
　　　CPC ..... *G06K 7/10089* (2013.01); *G06K 7/10069* (2013.01); *G06K 7/10217* (2013.01); *G06K 7/10227* (2013.01)
(58) Field of Classification Search
　　　CPC .......... G06K 7/10089; G06K 7/10069; G06K 7/10217; G06K 1/10227; H01Q 1/2208; H01Q 1/2216; H01Q 1/2225; H01Q 1/244; H01Q 1/243; H01Q 1/38
　　　See application file for complete search history.

(56) References Cited

U.S. PATENT DOCUMENTS

| | | |
|---|---|---|
| 2011/0080264 A1 | 4/2011 | Clare et al. |
| 2016/0042206 A1 | 2/2016 | Pesavento et al. |
| 2017/0224438 A1 * | 8/2017 | Johnson ................. A61B 90/90 |
| 2021/0374364 A1 * | 12/2021 | Peternel ............. G06K 19/0724 |
| 2022/0230040 A1 * | 7/2022 | Bergman ......... G06K 19/07773 |
| 2022/0394615 A1 | 12/2022 | Maleki et al. |
| 2023/0352809 A1 * | 11/2023 | Kim ..................... H01Q 1/2266 |
| 2025/0358629 A1 * | 11/2025 | Bertz ................... G06Q 10/083 |

FOREIGN PATENT DOCUMENTS

WO　　2026049993 A1　　3/2026

OTHER PUBLICATIONS

Foreign Communication from a Related Counterpart Application, International Search Report and Written Opinion dated Nov. 24, 2025, International Application No. PCT/US2025/041559 filed on Aug. 11, 2025.

\* cited by examiner

*Primary Examiner* — Awat M Salih

(57)　　　　　　ABSTRACT

An inventory system comprises an antenna configured to emit interrogation signals in a first direction toward one or more tags, a reader device configured to receive data from the one or more tags, and a controller. The controller is configured to detect a trigger event occurring within an area including the antenna, cause an adjustment to at least one antenna setting of the antenna or at least one reader device setting of the reader device based on the trigger event and a policy associated with the trigger event, and instruct the antenna or the reader device to emit an interrogation signal in a direction of one or more tags and read data from the one or more tags in accordance with the adjustment to at least one antenna setting or the at least one reader device setting.

20 Claims, 6 Drawing Sheets

106

103

400

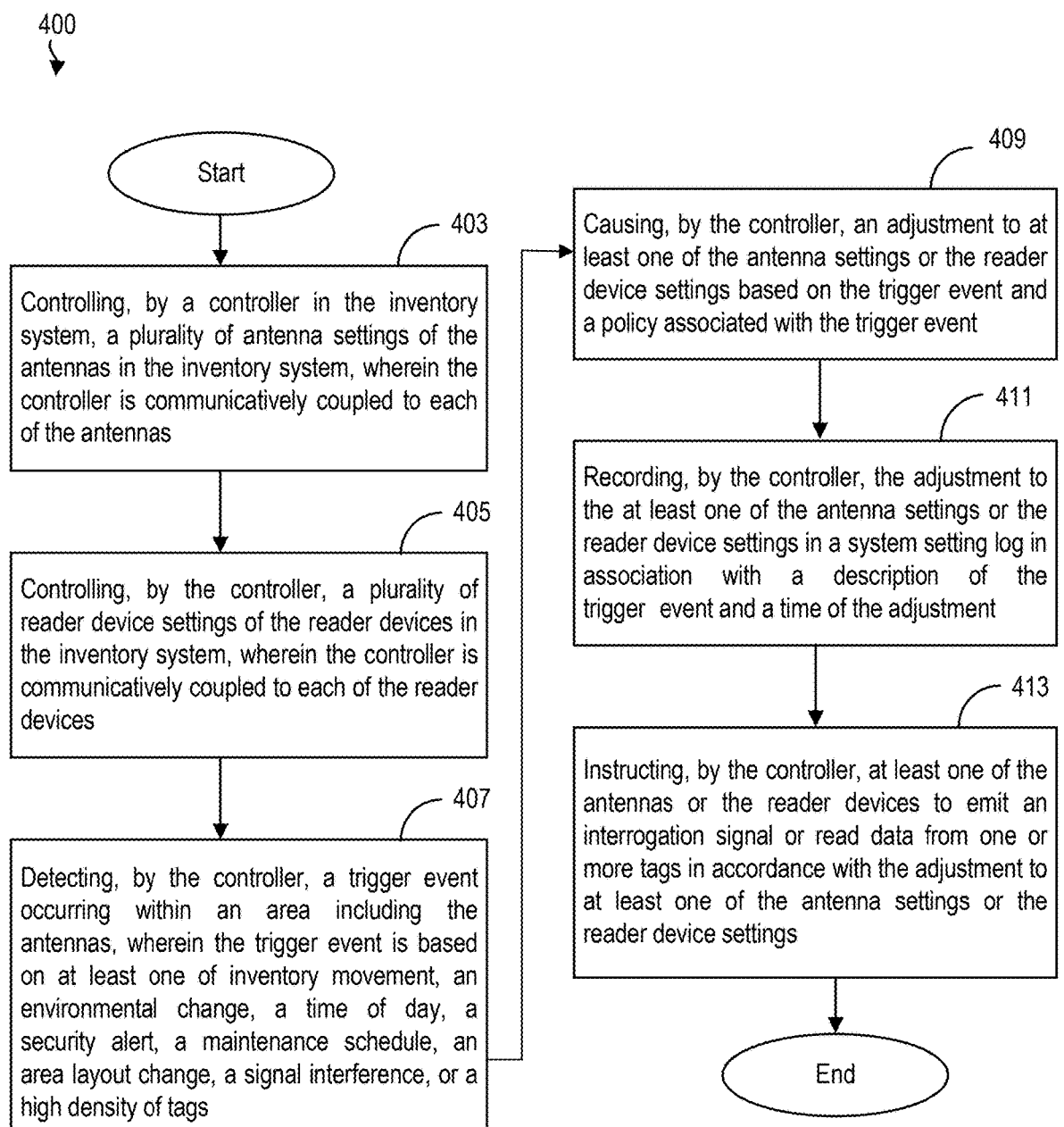

Start

403

Controlling, by a controller in the inventory system, a plurality of antenna settings of the antennas in the inventory system, wherein the controller is communicatively coupled to each of the antennas

405

Controlling, by the controller, a plurality of reader device settings of the reader devices in the inventory system, wherein the controller is communicatively coupled to each of the reader devices

407

Detecting, by the controller, a trigger event occurring within an area including the antennas, wherein the trigger event is based on at least one of inventory movement, an environmental change, a time of day, a security alert, a maintenance schedule, an area layout change, a signal interference, or a high density of tags

409

Causing, by the controller, an adjustment to at least one of the antenna settings or the reader device settings based on the trigger event and a policy associated with the trigger event

411

Recording, by the controller, the adjustment to the at least one of the antenna settings or the reader device settings in a system setting log in association with a description of the trigger event and a time of the adjustment

413

Instructing, by the controller, at least one of the antennas or the reader devices to emit an interrogation signal or read data from one or more tags in accordance with the adjustment to at least one of the antenna settings or the reader device settings End

FIG. 4

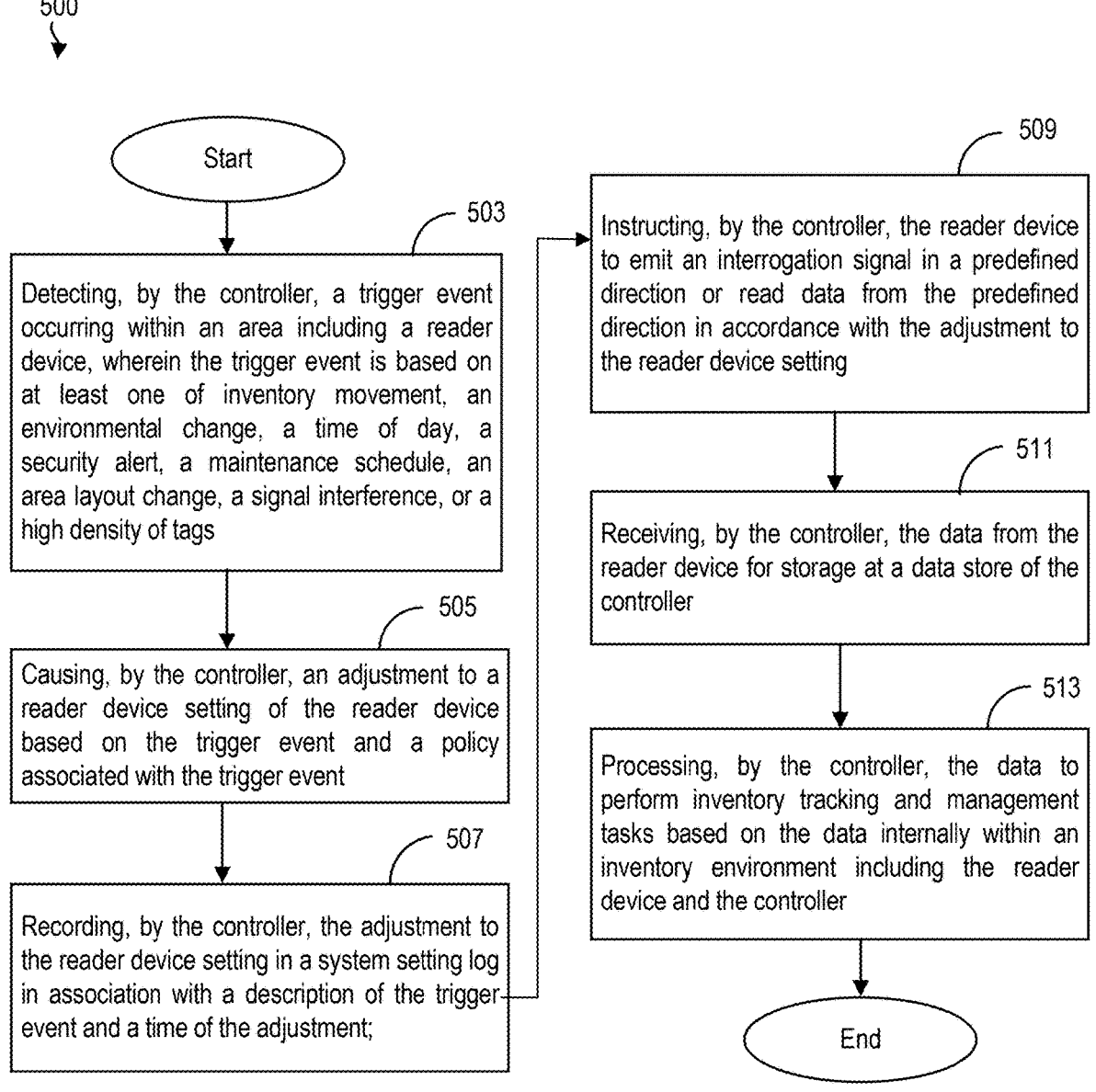

500

Start

503

Detecting, by the controller, a trigger event occurring within an area including a reader device, wherein the trigger event is based on at least one of inventory movement, an environmental change, a time of day, a security alert, a maintenance schedule, an area layout change, a signal interference, or a high density of tags

505

Causing, by the controller, an adjustment to a reader device setting of the reader device based on the trigger event and a policy associated with the trigger event

507

Recording, by the controller, the adjustment to the reader device setting in a system setting log in association with a description of the trigger event and a time of the adjustment;

509

Instructing, by the controller, the reader device to emit an interrogation signal in a predefined direction or read data from the predefined direction in accordance with the adjustment to the reader device setting

511

Receiving, by the controller, the data from the reader device for storage at a data store of the controller

513

Processing, by the controller, the data to perform inventory tracking and management tasks based on the data internally within an inventory environment including the reader device and the controller End

384 — Secondary Storage    CPU    RAM — 388

ROM — 386

Network — 392

METHODS AND SYSTEMS FOR CONTROLLING ANTENNAS AND READER DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a warehouse inventory system, the process typically begins when items arrive from suppliers and enter the warehouse. Upon arrival, items may be scanned and tagged with Radio-Frequency Identification (RFID) tags, which contain unique identifiers and other data describing the respective items. These RFID tags are used for real-time tracking and management of the items entering the warehouse. Antennas and RFID reader devices may be strategically placed throughout the warehouse and along the conveyor belts to read information about the item from the tag and update an inventory database in real-time. The antennas are used to send interrogation signals to the RFID tags, which power up and respond with their stored data. The reader devices then capture this data from the tags, enabling the tracking and identification of items in real-time.

SUMMARY

In an embodiment, a method performed in an inventory system to control a plurality of antennas and a plurality of reader devices of the inventory system is disclosed. The method comprises controlling, by a controller in the inventory system, a plurality of antenna settings of the antennas in the inventory system, in which the controller is communicatively coupled to each of the antennas, and controlling, by the controller, a plurality of reader device settings of the reader devices in the inventory system, in which the controller is communicatively coupled to each of the reader devices. The method further comprises detecting, by the controller, a trigger event occurring within an area including the antennas, in which the trigger event is based on at least one of inventory movement, an environmental change, a time of day, a security alert, a maintenance schedule, an area layout change, a signal interference, or a high density of tags, causing, by the controller, an adjustment to at least one of the antenna settings or the reader device settings based on the trigger event and a policy associated with the trigger event, and recording, by the controller, the adjustment to the at least one of the antenna settings or the reader device settings in a system setting log in association with a description of the trigger event and a time of the adjustment. The method also comprises instructing, by the controller, at least one of the antennas or the reader devices to emit an interrogation signal or read data from one or more tags in accordance with the adjustment to at least one of the antenna settings or the reader device settings.

In another embodiment, a method performed by a controller in an inventory system to control a plurality of reader devices of the inventory system is disclosed. The method comprising detecting, by a controller in the inventory system, a trigger event occurring within an area including a reader device, in which the trigger event is based on at least one of inventory movement, an environmental change, a time of day, a security alert, a maintenance schedule, an area layout change, a signal interference, or a high density of tags, causing, by the controller, an adjustment to a reader device setting of the reader device based on the trigger event and a policy associated with the trigger event, and recording, by the controller, the adjustment to the reader device setting in a system setting log in association with a description of the trigger event and a time of the adjustment. The method further comprises instructing, by the controller, the reader device to emit an interrogation signal in a predefined direction or read data from the predefined direction in accordance with the adjustment to the reader device setting, receiving, by the controller, the data from the reader device for storage at a data store of the controller, and processing, by the controller, the data to perform inventory tracking and management tasks based on the data internally within an inventory environment including the reader device and the controller.

In yet another embodiment, an inventory system is disclosed. The inventory system comprises an antenna configured to emit interrogation signals in a first direction toward one or more tags, a reader device configured to receive data from the one or more tags, and a controller communicatively coupled to the antenna and the reader device and comprising a controller application stored on a memory. The controller application, when executed by a processor, causes the controller to be configured to detect a trigger event occurring within an area including the antenna, in which the trigger event is based on at least one of inventory movement, an environmental change, a time of day, a security alert, a maintenance schedule, an area layout change, a signal interference, or a high density of tags, cause an adjustment to at least one antenna setting of the antenna or at least one reader device setting of the reader device based on the trigger event and a policy associated with the trigger event, and instruct the antenna or the reader device to emit an interrogation signal in a direction of one or more tags and read data from the one or more tags in accordance with the adjustment to at least one antenna setting or the at least one reader device setting.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4 is a flowchart illustrating a first method of performing inventory tracking and control according to various embodiments of the disclosure.

FIG. 5 is a flowchart illustrating a second method of performing inventory tracking and control according to various embodiments of the disclosure.

DETAILED DESCRIPTION

Figure 1:
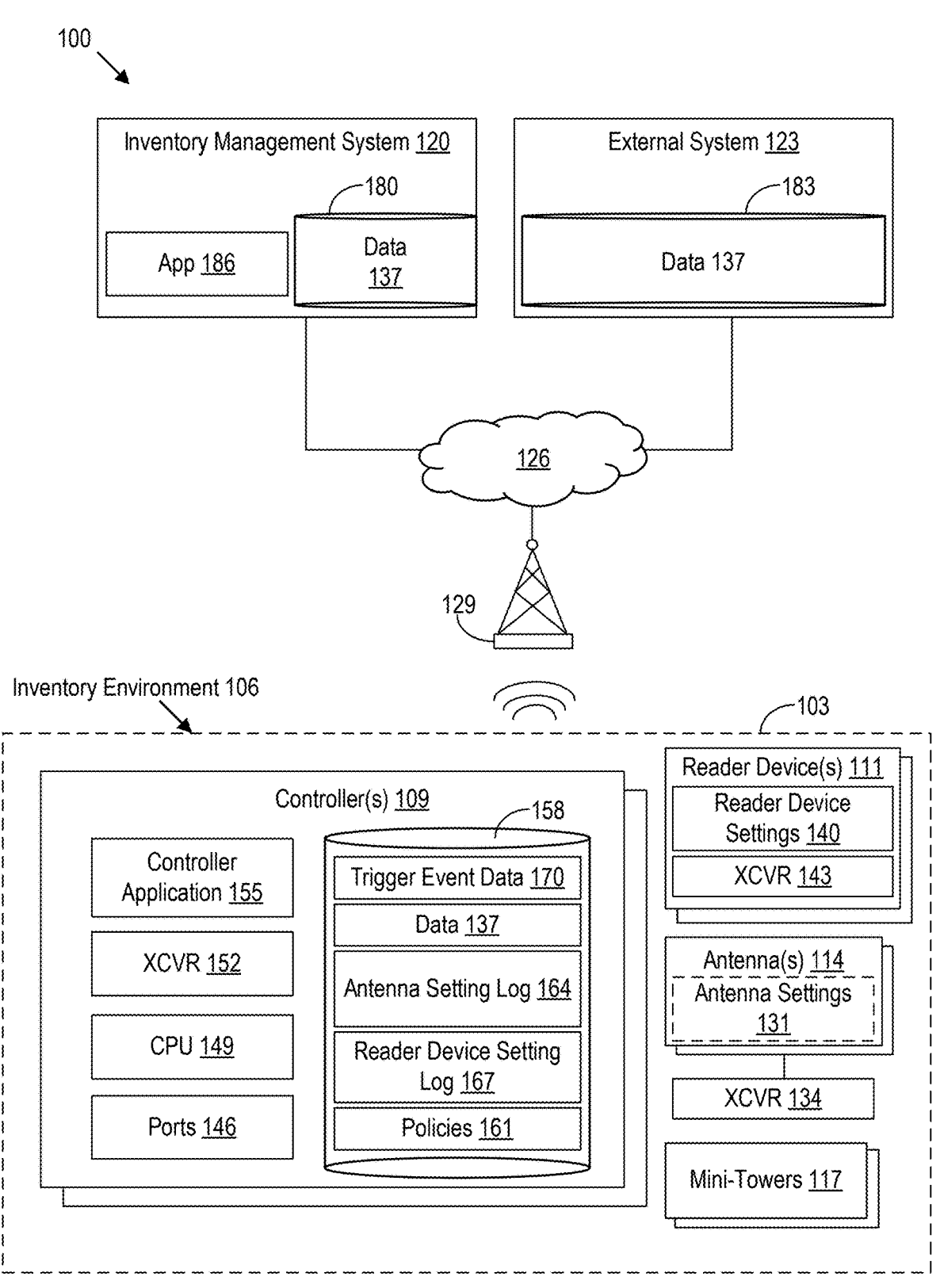
FIG. 1 is a block diagram of a communication network including an inventory system including one or more reader devices, antennas, and controllers according to various embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, an RFID tag (sometimes referred to herein as simply a "tag") is a small electronic device that stores data and communicates with antennas and RFID readers via radio waves for identification and tracking purposes. RFID tags are attached to different types of items, which may enter, pass through, be stored at, or exit different inventory environments. An inventory environment may refer to a location in which items may be stored or located at least temporarily. An inventory environment may be, for example, a warehouse or a retail store. An operator of the inventory environment may deploy antennas and/or reader devices throughout the inventory environment. Antennas may operate to emit interrogation signals (e.g., radio frequency signals) into a region including the items with the tags. The tags within the range of the emitted interrogation signals may receive the signals and use the energy from the signals to obtain enough power to send data back to reader devices (e.g., in the case of a passive RFID tag without a power source). Active RFID tags may have a power source and thus, may transmit data back to the reader devices without necessarily being prompted to do so with radio frequency signals. Once powered up, the tags may send data, such as a unique identifier of the tag, to a reader device.

The antennas and/or reader devices may have a fixed position or may be mobile (e.g., as part of a mobile device or positioned on a mobile vehicle). The antennas and reader devices may be separate devices positioned at different locations or may be integrated within a single device together. The antenna and reader devices in the inventory environment may be simple, lightweight devices that are not capable of performing computationally heavy tasks or processes. Instead, the antenna and reader devices positioned in the inventory environment may be solely responsible for predefined tasks. For example, antennas may be responsible for sending out interrogation signals to activate tags. The reader devices may receive the response signals containing the tags' data, process these response signals, extract the stored data, and transmit the data to a system external to the inventory environment. For example, the external system may be an external inventory management system that includes the processing and networking resources to perform tracking and management tasks using the data received from the tags. The tracking and management tasks performed using the data received from the tags may include, for example, real-time inventory tracking, automated reorder (e.g., automatically ordering more items when inventory falls below a threshold), asset management (e.g., tracking high-value assets/equipment), data analytics and reporting (e.g., generate insights, trends, reports, etc.), loss prevention (e.g., identify discrepancies between actual and expected inventory levels), supply chain optimization (e.g., improving logistics, providing visibility into item movement, etc.), and regulatory compliance (e.g., maintain inventory records for regulatory/standard compliance purposes).

The antennas and reader devices positioned in the inventory environment may not be capable of performing the aforementioned tracking and management tasks because the antennas and reader devices have insufficient processing resources to perform these tasks. Therefore, large quantities of data received from the tags in an inventory environment may have to be collected and then transmitted over a network, across great distances, to reach an external inventory management system, where the data may then be used for inventory tracking and management purposes. In this way, the use and positioning of the antennas and reader devices within the inventory environment is largely inefficient in that little to no inventory tracking and management operations may be performed within the inventory environment itself.

In addition, the settings of the antennas and/or reader devices within the inventory environment may be relatively fixed, such that the antennas and/or reader devices communicate with the tags blindly, with no knowledge of the items or package of items. For example, the antennas and reader devices use the same types of signals (e.g., radio frequency signals, WiFi signals, etc.) regardless of attributes of the items themselves (e.g., whether the items are being pushed through the warehouse individually or in a package, or regardless of the type or material of the items. Similarly, the antennas and reader devices use the same frequency ranges for all types of items, again regardless of attributes. The antennas and reader devices may be set to the same power level for all types of devices (resulting in a corresponding emission/read range) regardless of the material of the items, even though certain materials affect the range that the tags have data transmission (e.g., metal items may have a shorter range). In addition, each of the antennas may only be configured to emit signals at one time (i.e., multiple antennas in an antenna array may not emit interrogation signals simultaneously), and each antenna/reader device may have a limited range.

In this way, RFID reader/antenna device may receive an RFID signal and then forward information from the RFID signal to an external server. The reader/antenna device does not include the server equipment that is used to process the information received from the RFID signal. The reader/antenna device essentially operates as a standalone middleman device with no significant processing power or responsibility.

Therefore, the fixed configuration and programming of the antennas and/or reader devices in the inventory system may be highly inefficient, ultimately consuming more resources in the inventory system, thereby reducing the processing and network capacity in the inventory system and slowing down operations in the inventory environment. In addition, the aforementioned inefficiencies in the inventory environment may lead to technical problems in the communication network, such as, increased network congestion due to the transmission of data obtained from tags in the inventory environment, leading to a reduced processing capacity in the inventory environment and a reduced network capacity in the communication network.

The present disclosure addresses the foregoing technical problems by providing a technical solution in the technical field of inventory tracking, control, and management, by introducing a controller into the inventory environment (e.g., within the warehouse or retail store). The controller may be integrated with a reader device or may be a stand-alone device that is connected to the reader device and/or antennas either in a wired manner or wirelessly. The controller may include server equipment (e.g., hardware and software equipment) that may be used to process the data obtained from the tags, and the controller may be used to programmatically control/adjust the settings of the antennas and the reader devices. The controller may be a lightweight device that includes a sufficient amount of processing, power, storage, and radio resources (without a SIM), enabling the controller to operate as a server and perform actions based on the data obtained from the tags.

The inventory environment may include multiple controllers, each configured to control a subset of the antennas and/or reader devices positioned within the inventory environment. The different controllers may communicate with one another to create a mesh network using RFID-based communications via cellular communication bands. Therefore, the embodiments of the controller disclosed herein resolve the aforementioned technical problems by optimizing the settings/controls of the antennas and/or reader devices in the inventory system, while performing computation tasks within the inventory system, thereby reducing network congestion otherwise used to transmit the data to an external inventory management system.

In an embodiment, the inventory systems disclosed herein perform inventory tracking, control, and management by deploying multiple reader devices, antennas, and controllers within various areas of the inventory system. One or more of the reader devices may be integrated with the antennas as a single structure and/or one or more of the controllers may be integrated with the antennas and/or the reader devices as a single structure to emit interrogation signals toward and receive data from the tags. The controllers may be positioned at fixed locations or may be mobile (e.g., embodied as a mobile computing device or positioned on a mobile vehicle). The tags may be, for example, RFID tags, but may also be other types of tags configured to communicate other types of identification signals (e.g., optical signals, auditory signals, etc.) with the antennas, reader devices, and/or controllers.

In an embodiment, the reader devices may be programmable, such that the settings or configuration of the reader devices may be dynamically and programmatically adjusted ad-hoc based on attributes of the tags or items located in and/or moving through the inventory environment. Similarly, the antennas may be programmable, such that the settings or configuration of the reader devices may be dynamically and programmatically adjusted ad-hoc based on attributes of the tags or items located in and/or moving through the inventory environment. For example, the controller may programmatically control the settings and configurations of the associated antennas and/or reader devices based on the attributes of the items (e.g., location of the item, type of item, material of item, speed of item, direction of movement, size of item, etc.). The controller may also programmatically configure and/or adjust reader device settings and the antenna settings based on a predictive machine learning model (or "predictive model") trained using historical data describing prior settings of the antennas and/or reader devices and prior item storage/movement records.

In an embodiment, the controller may be responsible for controlling a subset of reader devices and/or antennas within an area of the inventory environment. The area may refer to a region or zone within the inventory environment (e.g., an area within a warehouse, a row within a retail store, etc.). Multiple controllers may control different areas within the inventory environment. Alternatively, a single controller may control all of the reader devices and/or antennas in the inventory environment.

To this end, the controller may be communicatively coupled to each of the associated reader devices and/or antennas in a wireless or wired manner. For example, the controller may include a radio transceiver, and each of the reader devices may also include a radio transceiver, such that the controller may communicate with the reader devices over cellular radio frequencies. The controller may also include multiple ports, and each antenna may be coupled to the controller via a wired connection to a respective port.

In an embodiment, a controller application of the controller may adjust the settings of the antennas and/or reader devices based on the detection of a trigger event. A trigger event may be a predefined condition or real-time occurrence that prompts the controller to adjust the configuration settings of the antennas and/or reader devices dynamically and programmatically (e.g., using code/logic stored at the controller). For example, a trigger event may be based on an inventory movement, an environmental change, a time of day, a security alert, a maintenance schedule, an area layout change, a signal interference, or a high density of tags. In an embodiment, the controller application may cause an adjustment to at least one of the antenna settings and/or reader device settings based on the trigger event and a policy indicating adjustments to the antenna settings and/or the reader device settings. To this end, the controller application may store various policies (e.g., rules) indicating that certain trigger events (in some cases, combined with one or more other conditions) may be associated with a particular adjustment to one or more settings across the antennas and/or reader devices controlled by the controller.

For example, an inventory movement-based trigger event may occur upon the controller application detecting a high inventory movement in a specific area. The controller application may identify a rule, based on the inventory movement-based trigger event, to adjust the settings of the antennas and/or reader devices to increase scanning frequency and/or power levels of the antennas and/or reader devices to ensure that all tags are read accurately during the high-activity period. The controller application may then adjust (or cause the adjustment to) the settings of the antennas and/or reader devices accordingly.

An environment change-based trigger event may occur upon the controller application detecting a significant change in temperature or humidity within the area, as detected by sensors positioned in the area, which communicated the change to the controller application. The controller application may identify a rule, based on the environment change-based trigger event (e.g., based on the change in temperature or humidity within the area), to adjust the frequency band and/or power settings of the antennas and/or reader devices to maintain optimal tag read rates despite the environmental changes. The controller application may then adjust (or cause the adjustment to) the settings of the antennas and/or reader devices accordingly.

A time of day-based trigger event may occur upon the controller application detecting a transition to different times of the day (e.g., shift changes or overnight hours). The controller application may identify a rule, based on the time of day-based trigger event (e.g., based on the time of day), to adjust the power levels of the antennas and/or reader devices to conserve energy or provide better performance during peak hours. The controller application may then adjust (or cause the adjustment to) the settings of the antennas and/or reader devices accordingly.

A security alert-based trigger event may occur upon the controller application detecting a scheduled maintenance or system check (e.g., upon request or based on a pre-defined schedule). The controller application may identify a rule, based on the security alert-based trigger event, to adjust the power levels (e.g., disable) of the antennas and/or reader devices to avoid interference with maintenance activities, ensuring safety and compliance with maintenance protocols. The controller application may then adjust (or cause the adjustment to) the settings of the antennas and/or reader devices accordingly.

An area layout change-based trigger event may occur upon the controller application detecting a reconfiguration of a layout in the area or a relocation of inventory racks. The controller application may identify a rule, based on the area layout change-based trigger event, to recalibrate the settings of the antennas and/or reader devices (e.g., robotically change the position or direction of the antennas and/or reader devices) to account for new positions and potential obstacles and to ensure continued optimal coverage. The controller application may then adjust (or cause the adjustment to) the settings of the antennas and/or reader devices accordingly.

An interference detected-based trigger event may occur upon the controller application detecting signal interference from other devices or nearby systems communicating over the same frequency bands (cellular and/or RFID frequency bands). The controller application may identify a rule, based on the interference detected-based trigger event, to adjust the frequency band and/or power settings of the antennas and/or reader devices to mitigate interference and maintain reliable communication with the tags. The controller application may then adjust (or cause the adjustment to) the settings of the antennas and/or reader devices accordingly.

A high density-based trigger event may occur upon the controller application detecting an area or region with a high density of tags (e.g., during stock-taking or restocking). The controller application may identify a policy, based on the high density-based trigger event, to focus the beams of the antennas and/or reader devices more narrowly to increase polling rates and handle the higher volume of tags efficiently. The controller application may then adjust (or cause the adjustment to) the settings of the antennas and/or reader devices accordingly.

After adjusting the settings of the antennas and/or reader devices, the controller application may record the setting adjustments in a setting log stored at the controller (e.g., an antenna setting log when an antenna setting is adjusted and/or a reader device setting log when a reader device setting is adjusted). The setting adjustment may be stored in the setting log in association with a description of the trigger event and a time of the setting adjustment. Once the adjustment is complete, the controller application may instruct one or more antennas to emit an interrogation signal based on the setting adjustment (e.g., in a different direction of one or more tags, at a different frequency, for a different period of time, using a different power level, etc.). Similarly, the controller application may instruct one or more reader devices to read data from one or more tags according to the setting adjustment (e.g., in a different direction, at a different frequency, for a different period of time, using a different power level, etc.).

The reader devices may receive data from the tags, and then transmit the data back to the controller. The controller application may in some cases perform one or more of the aforementioned inventory tracking and management tasks on behalf of the external inventory management system. In this way, the data obtained from the tags may not have to be transmitted over the network to the external inventory management system, but may instead be retained within the inventory environment (the controllers within the inventory environment).

As mentioned above, the reader devices, antennas, and controllers may communicate over cellular radio signals and over wired connections (e.g., Ethernet connections). One or more mini-towers (e.g., compact cell sites that may fit within the building of the inventory environment) may be deployed in the inventory environment. The mini-towers may improve connectivity and ensure reliable communications within the inventory environment and external to the inventory environment. The mini-towers may be embodied, for example, as traditional cell towers, femtocells, picocells, or microcells.

In this way, the embodiments disclosed herein are directed to a lightweight, integrated antenna/reader device, that includes server equipment (e.g., hardware and software equipment) that may be used to process the information received in the RFID signal. The device may be lightweight in that it includes a sufficient amount of processing, power, storage, and radio resources (without a SIM), enabling the device to operate as a server and perform actions based on the information received in the RFID signal. The device may communicate with a mini-tower (e.g., PICO/FEMTO cell) positioned within a warehouse, allowing the device to directly sync to cloud-based services when applicable. The devices may also communicate with other devices in the warehouse, creating a mesh network using RFID communications via cellular communication bands (e.g., 800 MHz frequency band).

The embodiments disclosed herein also introduce an internal controller within an inventory environment, in which the controller may dynamically and programmatically control the configuration and settings of antennas and reader devices within the inventory environment based on detected trigger events. The controller may also perform some of the inventory tracking and management steps internally, rather than relying on an external inventory management system to perform the inventory tracking and management tasks, thereby reducing network congesting and securing the data obtained from the tags (e.g., by not forwarding them through the network unnecessarily). Therefore, the embodiments disclosed herein increase resource efficiency within the inventory system while increasing overall network capacity.

Turning now to FIG. 1, a communication network 100 is described. The communication network 100 includes an inventory system 103 positioned at an inventory environment 106, an inventory management system 120, an external system 123, a network 126, and a cell site 129. The inventory system 103 includes one or more controllers 109 (sometimes referred to herein as a "controller 109"), one or more reader devices 111 (sometimes referred to herein as a "reader device 111"), one or more antennas 114 (sometimes referred to herein as an "antenna 114"), and one or more mini-towers 117 (sometimes referred to as a "mini-tower 117"). The cell site 129 may provide a wireless communication link to controllers 109, reader devices 111, and antennas 114 according to a 5G, a long term evolution (LTE), a code division multiple access (CDMA), or a global system for mobile communications (GSM) wireless telecommunication protocol.

The mini-towers 117 may be similar to the cell site 129, providing a wireless communication link to controllers 109, reader devices 111, and antennas 114 according to a 5G, a LTE, a CDMA, or a GSM wireless telecommunication protocol. However, unlike the cell site 129, the mini-towers 117 may include less equipment or more compact versions of the equipment, such that the mini-towers 117 are lightweight compared to the cell site 129. For example, the mini-towers 117 may be embodied, for example, as traditional cell towers, femtocells, picocells, or microcells. The network 126 may be one or more private networks, one or more public networks, or a combination thereof. While the inventory system 103 is shown as separate from the network 126, in some embodiments, the inventory system 103 may be part of the network 126. While FIG. 1 depicts the controllers 109, reader devices 111, and antennas 114 as separate components, it should be appreciated that the controllers 109, reader devices 111, and antennas 114 may also be integrated in a single device that includes the capabilities of the controllers 109, reader devices 111, and/or antennas 114.

The antennas 114 may be embodied as antenna arrays or separate standalone antennas 114, with multiple different antenna elements. The antennas 114 may emit or transmit interrogation signals to the tags coupled to items moving through and stored in the inventory environment 106, to communicate with the tags. The signals may be, for example, radio frequency signals, WiFi signals for wireless networks, BLUETOOTH signals for short-range communications, ZIGBEE signals for low-power, short-range data transfers, optical signals, audio signals, etc. It should be appreciated that the antennas 114 may transmit any type of signal depending on the technologies and devices used for warehouse management, such as wireless networks, handheld scanners, or sensor devices. The antennas 114 may be any type of antenna, such as, for example, an omnidirectional antenna or a directional antenna. The antennas 114 may have different shapes and sizes and include one or more different elements based on the specific functionality of the antenna 114. The antennas 114 may include various beamforming mechanisms to adjust the amplitude and phases of signals from different antenna elements to emit the signals as directional beams. The inventory environment 106 may include different types of antennas 114 positioned at various areas of the inventory environment 106.

In an embodiment, one or more antennas 114 may be positioned at a distal end of a robotic arm. One or more antennas 114 may each be positioned by a pan-tilt electromechanical device associated with the antenna 114. The robotic arm may be detachably attached or coupled to one or more of the antennas 114. The robotic arm may include links intercoupled by joints and may be robotically manipulatable by the controller 109. The controller 109 may control movement of the links and joints on the robotic arm to ultimately control the movement, angle, direction, and positioning of the one or more antennas 114 attached to the robotic arm.

Each antenna 114 may include one or more antenna elements (e.g., dipoles). Each antenna 114 may be coupled to a radio transceiver 134 (e.g., with an impedance matching device or a balun device). The radio transceiver 134 may be used to transmit and receive radio cellular signals from the controllers 109 and/or reader devices 111 within the inventory environment 106 (e.g., in some cases, via the mini-towers 117) and to transmit and receive radio cellular signals from other systems and servers external to the inventory system 103. For example, the radio transceiver 134 may include a baseband component that processes signals that are relatively low frequency, an up/down converter (up converts baseband signals to high frequencies to transmit via the antennas 114 and down converts high frequencies received by the antennas 114 to a baseband frequency), and a radio frequency power amplifier. The term "antenna 114" as used herein may in some cases refer to the combination of the antenna 114 and the radio transceiver 134.

Each antenna 114 may be associated with one or more antenna settings 131. The antenna settings 131 may include, for example, at least one of a type of the signals, a frequency range of the signals, a position of the antenna 114 (e.g., via the robotic arm), a location of the antenna 114 in the inventory environment 106, the orientation of the antenna 114, the antenna gain of the antenna 114, the transmit power of the antenna 114, or any other type of antenna setting. Additionally, antenna settings 131 may include phase offsets between different elements of an array of individual antenna elements forming an antenna 114 which may be used to steer a beam of the antenna 114 (e.g., to redirect the beam of the antenna by changing the phase offsets between the antenna elements). Antenna settings 131 may be stored in the radio transceiver 134 and/or proximate the antenna 114 (e.g., in a pan-tile electromechanical structure associated with each antenna 114).

The antenna settings 131 may be initially set by the controller 109 (e.g., via the radio transceiver 134) and subsequently adjusted by the controller 109 (e.g., via the radio transceiver 134). In some cases, the controller 109 may adjust the antenna settings 131 by adjusting settings of the radio transceiver 134. For example, adjustments to the antenna settings 131 may be performed by adjusting settings/configurations of the radio transceiver 134 (e.g., adjusting the power of the radio transceiver 134 to adjust a power level of the antenna 114, altering the time phasing of signals provided to antennas 114 to steer a beam formed by an array of antennas 114, etc.). In some cases, the controller 109 may adjust the antenna settings 131 by controlling the position of movement of a robotic arm to which an antenna 114 is attached (e.g., using inverse kinematics).

The reader devices 111 may be electronic devices or computing systems configured to receive data back from the tags coupled to the items. The reader device 111 may also be detachably attached to a robotic arm to control the movement, angle, direction, and positioning of the reader device 111. The reader devices 111 may detect and receive responses from the tags, decode data 137 included in the responses, and extract specific data 137 to transmit to the controller 109 (e.g., via the mini-tower 117). To this end, each reader device 111 may include an application that obtains (e.g., decodes and extracts) data 137 from the signals in the tags and transmits the data to the controller 109.

Each reader device 111 may include one or more reader device settings 140. The reader device settings 140 may include, for example, a type of the signals, the frequency range of the signals, the position of the reader device 111 (e.g., via the robotic arm), directional settings of an antenna 114 connected to the reader device 111 and/or of the reader device 111, the output power of the reader device 111, or any other type of reader device setting. Each reader device 111 may also include a radio transceiver 143, which may be used to transmit and receive radio cellular signals from the controllers 109 and/or antennas 114 within the inventory environment 106 (e.g., in some cases, via the mini-towers 117) and to transmit and receive radio cellular signals from other systems and servers external to the inventory system 103.

The controller 109 may be a device, UE, computer, or computer system, with various types of resources that may be interworked to control the operations of the reader devices 111 and antennas 114 associated with the controller 109 (e.g., assigned to be controlled by the controller 109) within an area of the inventory environment 106. The controller 109 may include a one or more ports 146, a central processing unit 149, a radio transceiver 152, a controller application 155, and/or a data store 158 (e.g., memories). The ports 146 may be used to connect directly to the antennas 114 and/or reader devices 111 using a wired connection. The radio transceiver 152 may be used to communicate radio cellular signals with the reader devices 111 and antennas 114 in the inventory environment 106 (e.g., in some cases, via the mini-towers 117) and other systems and servers external to the inventory system 103. The CPU 149 may include one or more processors, used to execute the controller application 155. The controller application 155 may be instructions stored in the data store 158, which may be executed by the CPU 149 to perform the steps of method 400 and 500 disclosed herein.

The controller application 155 may be used to set and control the reader device settings 140 and the antenna settings 131. As described herein, the controller application 155 may detect a trigger event, identify a policy 161 associated with the trigger event, and adjust the reader device settings 140 and/or the antenna settings 131 based on the policy 161. The controller application 155 may add a record to an antenna setting log 164 when an adjustment is made to an antenna setting 131, and add a record to a reader device setting log 167 when an adjustment is made to a reader device setting 140. The record may include trigger event data 170 describing the trigger event that triggered the adjustment, and a time of the adjustment. The reader devices 111 and antennas 114 may operate to emit interrogation signals and receive data 137 back from the tags in the inventory environment 106 in accordance with the adjusted reader device settings 140 and the antenna settings 131. The reader devices 111 may transmit the data 137 to the controller application 155. The controller application 155 may store, in the data store 158, the data 137 (obtained from the tags), the policies 161, the antenna setting log 164, the reader device setting log 167, and the trigger event data 170, as shown in FIG. 1.

The controller application 155 may perform inventory tracking and management related tasks based on the data 137 obtained from the tags. For example, the inventory tracking and management tasks may include real-time inventory tracking, automated reorder (e.g., automatically ordering more items when inventory falls below a threshold), asset management (e.g., tracking high-value assets/equipment), data analytics and reporting (e.g., generate insights, trends, reports, etc.), loss prevention (e.g., identify discrepancies between actual and expected inventory levels), supply chain optimization (e.g., improving logistics, providing visibility into item movement, etc.), and regulatory compliance (e.g., maintain inventory records for regulatory/standard compliance purposes). These tasks may be at least some of the tasks that would have otherwise been performed by the external inventory management system 120 or an external system 123, both of which are external to the inventory environment 106. In some cases, the controller application 155 may transmit one or more data items from the data 137 to the external inventory management system 120 or the external system 123. The inventory management system 120 may store the data 137 in a first data store 180, and the external system 123 may store the data 137 in a second data store 183. In some cases, the application 186 in the inventory management system 120 may perform some of the same tasks performed by the controller application 155.

In an embodiment, the inventory system 103 may include one or more sensors (e.g., temperature or humidity sensors). Each sensor may include a radio transceiver. Each sensor may receive environment data (e.g., temperature of the inventory environment 106, humidity within the inventory environment 106, and data on other environmental conditions within the inventory environment 106), and transmit the environment data to the controller 109 using the radio transceiver. The controller 109 may store the environment data in the data store 158, and the controller application 155 may use the environment data to identify a trigger event, as further described herein.

The controller application 155 may also include a security application configured to detect security alerts based on security threats within an area of the inventory environment 106. The controller application 155 is further configured to receive the security alert from the security application and use the security alert to identify a trigger event, as further described herein.

Figure 2:
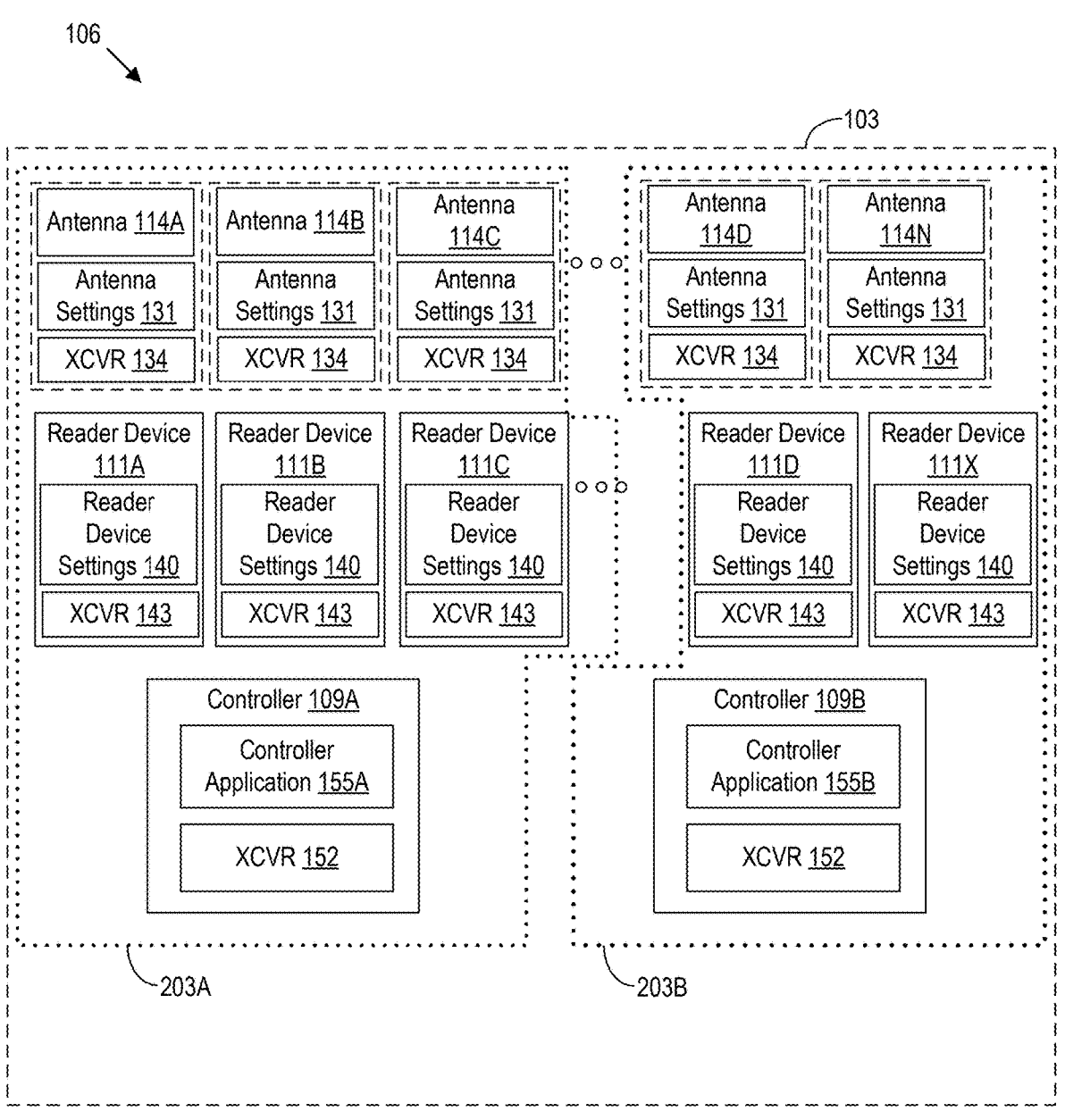
FIG. 2 is a diagram illustrating the antennas, reader devices, and controllers of FIG. 1 in a warehouse or retail environment according to various embodiments of the disclosure.

Referring now to FIG. 2, shown is a block diagram illustrating an inventory environment 106 including the inventory system 103, split up as two groups 203A and 203B according to various embodiments of the disclosure. In the example shown in FIG. 2, the inventory environment 106 includes multiple antennas 114A-N, reader devices 111A-X, and controllers 109A-B. The inventory system 103 includes a higher quantity of antennas 114A-N compared to a quantity of reader devices 111A-X (N is greater than X). The inventory system 103 includes a lower quantity of controllers 109A-B compared to the quantity of antennas 114A-N and the quantity of reader devices 111A-X (B is less than X and less than N).

The inventory environment 106 includes two groups 203A and 203B (although it should be appreciated that an inventory environment 106 may include any number of groups corresponding to different areas). Each group 203A and 203B includes a single controller 109A and 109B, respectively. Each controller 109A and 109B controls a subset of the antennas 114A-N and reader devices 111A-X in the inventory environment 106. As shown in FIG. 2, controller 109A may be assigned to control the antennas 114A-C and reader devices 111A-C only. For example, the controller 109A may have an authorized and established cellular radio connection with the reader devices 111A-C and/or the antennas 114A-C over a predefined frequency channel. The cellular radio connection may be established between the radio transceiver 152 of controller 109A, the radio transceiver 134 of the antennas 114A-C, and the radio transceiver 143 of the reader devices 111A-C. This connection may be strengthened using one or more mini-towers 117 positioned in the inventory environment 106. In addition or alternatively, the controller 109A may have a wired connection (e.g., Ethernet connection) with the reader devices 111A-C and/or the antennas 114A-C. For example, antennas 114A-C may be connected, via wires, to three different ports 146 of the controller 109.

Similarly, controller 109B may be assigned to control the antennas 114D-N and reader devices 111D-X only. For example, the controller 109B may have an authorized and established cellular radio connection with the reader devices 111D-X and/or the antennas 114D-N. In addition or alternatively, the controller 109A may have a wired connection (e.g., Ethernet connection) with the reader devices 111D-X and/or the antennas 114D-N.

In an embodiment, the controller application 155A of controller 109A may be responsible for setting and adjusting the antenna settings 131 of antennas 114A-C (e.g., by adjusting the settings of the corresponding radio transceiver 134 and/or a robotic arm to which the antenna 114A-C is attached) and setting and adjusting the reader device settings 140 of the reader devices 111A-C, in some cases, in response to the detection of a trigger event. Similarly, the controller application 155B of controller 109B may be responsible for setting and adjusting the antenna settings 131 of antennas 114D-N and setting and adjusting the reader device settings 140 of the reader devices 111D-X, in some cases, in response to the detection of a trigger event.

In an embodiment, each of the groups 203A and 203B may correspond to an area within the inventory environment 106 (e.g., one set of pallets within a warehouse, one or more regions within a retail store, etc.). The controller 109A or 109B may be responsible for the antennas 114A-N and reader devices 111A-X within the area of the inventory environment 106. The antennas 114A-C and reader devices 111A-C may be located within a first area of the inventory environment 106, while the antennas 114D-N and reader devices 111D-X may be located within a second area of the inventory environment 106.

Figure 3:
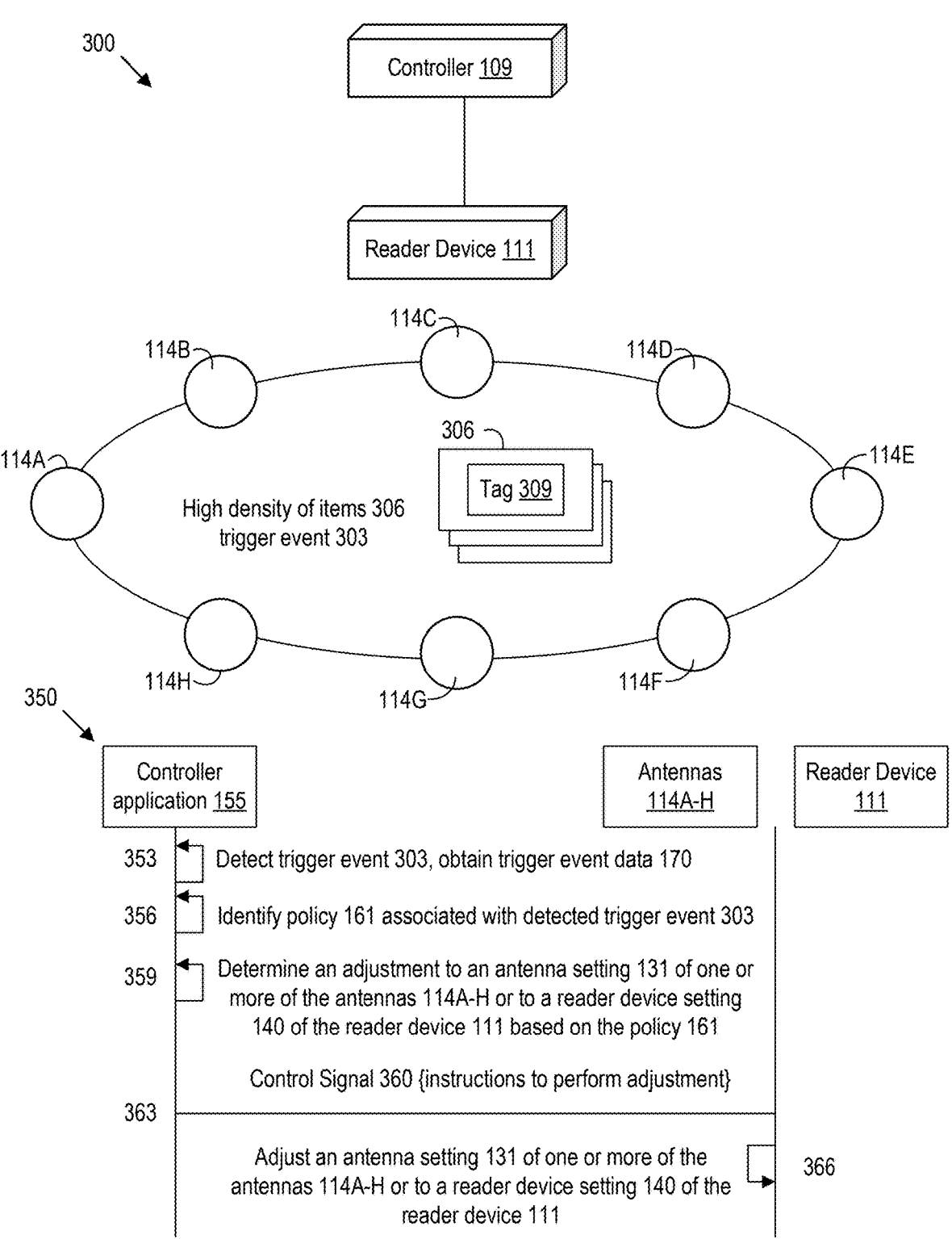
FIG. 3 is a diagram illustrating an implementation of the antennas, reader devices, and controllers of FIG. 1 according to various embodiments of the disclosure.

Referring now to FIG. 3, shown is an example area 300 within an inventory environment 106, including a controller 109 responsible for controlling a reader device 111 and antennas 114A-H. It should be appreciated that other reader devices 111 and antennas 114 may be included in the area 300. However, the example area 300 shown in FIG. 3 is for illustrative purposes only. While only one reader device 111 and one controller 109 are shown in the area 300, it should be appreciated that any number of controllers 109 and reader devices 111 may be included in the area 300.

As shown in FIG. 3, the antennas 114A-H are arranged as a circular/oval-shaped antenna array. For example, there may be a physical structure securing and coupling the antennas 114A-H together such that the antennas 114A-H are aligned in common horizontal plane relative to one another. However, it should be appreciated that the antennas 114A-H need not be aligned in the same plane, and instead, may all be at different vertical heights relative to the floor. The antennas 114A-H may be equidistant from each other, or the antennas 114A-H may be randomly placed along the structure.

In one moment, all of the antennas 114A-H may be positioned and angled to emit interrogation signals in different, random directions. The controller 109 may detect a trigger event 303 occurring within the area 300, the trigger event 303 indicating that a high density of items 306 has moved into the area 300, specifically, to a location in the center of the circular-shaped antenna array with antennas 114A-H. The controller application 155 may detect the trigger event 303, or the movement of the high density of items 306 into the center of the antenna array, for example, by detecting movement of the tags 309 on each of the items 306 into the center of the antenna array, or receiving an indication from the reader device 111 indicating the movement of the tags 309 on each of the items 306 into the center of the antenna array. For example, another controller 109 in the inventory environment 106 may have transmitted a message to the controller 109 in the area 300 indicating that a certain quantity of items 306 or tags 309 are moving in a direction toward area 300. The controllers 109 may communicate using the radio transceiver 152 and/or the mini-towers 117. The reader device 111 in area 300 may also detect a location and quantity of items 306 or tags 309 in the area 300 based on the fixed, known location of the reader device 111, a detected signal strength of the tag, phase difference measurements, time differences of arrival, etc.

FIG. 3 also illustrates a message sequence diagram 350, illustrating operations performed by the controller application 155 of the controller 109, the antennas 114A-H, and the reader device 111 in the area 300. At operation 353, the controller application 155 may detect the trigger event 303 by either detecting the location of the items 306 and tags 309 and/or receiving an indication of the location of the items 306 and tags 309 from the reader device 111. The controller application 155 may also obtain trigger event data 170 describing parameters associated with the trigger event 303 (e.g., time of detecting the trigger event 303, location of the reader device 111 and/or items 306/tags 309 associated with the trigger event 303, type of trigger event 303 (e.g., high density trigger event 303)).

At operation 356, the controller application 155 may identify a policy 161 associated with the detected trigger event 303. For example, the policy 161 may include an identification of the type of trigger event 303 (e.g., a value representing a high density trigger event 303), and a corresponding adjustment to an antenna setting 131 of one or more of the antennas 114A-H or to a reader device setting 140 of the reader device 111 based on the trigger event data 355. For example, the adjustment may be based on a location of the items 306/tags 309, a location of the antennas 114A-H, and the type of the detected trigger event 303.

At operation 359, the controller application 155 may determine an adjustment to an antenna setting 131 of one or more of the antennas 114A-H or to a reader device setting 140 of one or more of the reader devices 111 based on the policy 161. For example, a policy 161 may indicate an adjustment to the antenna settings 131 to increase the range of each of the antennas 114A-H and to increase the power of the beams without actually increasing the power level at each of the antennas 114A-H by simultaneously emitting interrogation signals towards the items 306 and tags 309 for a predefined period of time. To this end, the adjustment to the antenna settings 131 may include an adjustment to reposition each of the antennas 114A-H in a direction towards the items 306 and tags 309 (e.g., by robotically controlling the antennas 114A-H or a robotic arm attached to the antennas 114A-H). The adjustment to the antenna settings 131 may include aligning the frequencies of the signals emitted by the antennas 114A-H into a single radio frequency band. For example, the single radio frequency band may be an 800 MHz frequency band, or another frequency band typically used for cellular radio communications (not RFID communications). The adjustment to the antenna settings 131 may include beamforming adjustments to each of the antennas 114A-H by adjusting the amplitude and phase of the signals from the different antennas 114A-H. It should be appreciated that any antenna setting 131 (or reader device setting 140) may be adjusted to optimize the powering up of the tags 309 and reading data from the tags 309.

At step 363, the controller application 155 may transmit a control signal 360 to the antennas 114A-H and/or reader device 111 for which an adjustment is determined in operation 359. The control signal 360 may be a message or an instruction for the antennas 114A-H and/or reader device 111 to perform the adjust determined in operation 359. For example, the control signal 360 may include instructions to adjust an orientation or angle of antennas 114A-B (e.g., the control signal 360 may explicitly indicate the angle/orientation to which the antennas 114A-B are to be adjusted). The antennas 114A-B may receive an instruction to adjust the orientation or angle of the antennas 114A-B to be directed to the tags 309. At operation 366, the antennas 114A-B may automatically or robotically adjust the orientation or angle of the antennas 114A-B to be directed to the tags 309.

Figure 6:
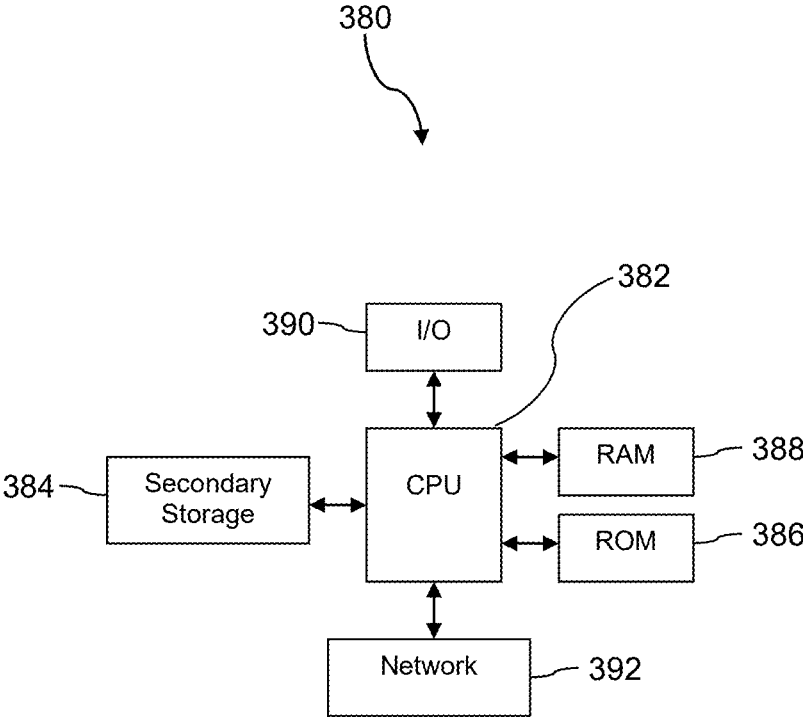
FIG. 6 is a block diagram of a computer system implemented within the communication system of FIG. 1 according to an embodiment of the disclosure.

Referring now to FIG. 4, shown is a method 400. Method 400 may be implemented by the controller 109 of the inventory system 103 of FIG. 1. In embodiments, the method 400 may be implemented using a computer system with components as shown in FIG. 6. As illustrated, method 400 of FIG. 4 includes a number of enumerated operations, but embodiments of the operations in FIG. 4 may include additional operations before, after, and in between the enumerated operations. In some embodiments, one or more of the enumerated operations may be omitted or performed in a different order.

At step 403, method 400 may comprise controlling, by a controller 109 in the inventory system 103, a plurality of antenna settings 131 of the antennas 114 in the inventory system 103. The controller 109 is communicatively coupled to each of the antennas 114. At step 405, method 400 may comprise controlling, by the controller 109, a plurality of reader device settings 140 of the reader devices 111 in the inventory system 103. The controller 109 is communicatively coupled to each of the reader devices 111.

At step 407, method 400 may comprise detecting, by the controller 109, a trigger event 303 occurring within an area 300 including the antennas 114. The trigger event 303 is based on at least one of inventory movement, an environmental change, a time of day, a security alert, a maintenance schedule, an area layout change, a signal interference, or a high density of tags 309. At step 409, method 400 comprises causing, by the controller 109, an adjustment to at least one of the antenna settings 131 or the reader device settings 140 based on the trigger event 303 and a policy 161 associated with the trigger event 303.

At step 411, method 400 may comprise recording, by the controller 109, the adjustment to the at least one of the antenna settings 131 or the reader device settings 140 in a system setting log (e.g., antenna setting log 164, reader device setting log 167) in association with a description of the trigger event 303 and a time of the adjustment. At step 413, method 400 may comprise instructing, by the controller 109, at least one of the antennas 114 or the reader devices 111 to emit an interrogation signal or read data 137 from one or more tags 309 in accordance with the adjustment to at least one of the antenna settings 131 or the reader device settings 140.

Method 400 may further comprise additional attributes and/or steps not explicitly shown in FIG. 4. In an embodiment, the adjustment to at least one of the antenna settings 131 or the reader device settings 140 comprises an adjustment to a direction of the plurality of the antennas 114 to direct beams from each of the antennas 114 to a predefined location (e.g., the center of the antenna array in FIG. 3) based on the trigger event 303 indicating the predefined location including the high density of tags 309.

In an embodiment, the adjustment to at least one of the antenna settings 131 or the reader device settings 140 comprises an adjustment to an output power of a subset of the antennas 114 based on the trigger event 303 indicating a distance between at least one of the antennas 114 or the reader devices 111 exceeds a predefined threshold. For example, the antennas 114 may be initially set with a power level that is not sufficient to emit signals at the distance between the antennas 114 and the tags 309, and the adjustment to the antenna settings 131 may include an adjustment to increase the power level of the antennas 114. At the increased power level, the antennas 114 may be capable of emitting signals at the distance between the antennas 114 and the tags 309.

In an embodiment, when the trigger event 303 is based on the environmental change, the environmental change is related to a temperature or humidity detected by one or more sensors of the inventory system 103, and the adjustment to at least one of the antenna settings 131 or the reader device settings 140 comprises an adjustment to a frequency band or power setting to maintain optimal read rates when operating in the temperature or humidity. In an embodiment, when the trigger event 393 is based on the inventory movement within a region of the area 300 indicating a high density of moving tags 309, the adjustment to at least one of the antenna settings 131 or the reader device settings 140 comprises an adjustment to a frequency band or power setting to ensure all tags are read accurately. In an embodiment, the frequency band for communication by the antenna and the reader devices is set to the 800 MHz frequency band.

In an embodiment, when the trigger event 303 is based on the maintenance schedule, the adjustment to at least one of the antenna settings 131 or the reader device settings 140 comprises an adjustment to a power of one or more of the antennas to avoid interference with maintenance activities. In an embodiment, when the trigger event 303 is based on the signal interference, the adjustment to at least one of the antenna settings 131 or the reader device settings 140 comprises an adjustment to a frequency band or power setting to mitigate the signal interference and maintain reliable communication with the tags.

Referring now to FIG. 5, shown is a method 500. Method 500 may be implemented by the controller 109 of the inventory system 103 of FIG. 1. In embodiments, the method 500 may be implemented using a computer system with components as shown in FIG. 6. As illustrated, method 500 of FIG. 5 includes a number of enumerated operations, but embodiments of the operations in FIG. 5 may include additional operations before, after, and in between the enumerated operations. In some embodiments, one or more of the enumerated operations may be omitted or performed in a different order.

At step 503, method 500 may comprise detecting, by the controller 109, a trigger event 303 occurring within an area 300 including the antennas 114. The trigger event 303 is based on at least one of inventory movement, an environmental change, a time of day, a security alert, a maintenance schedule, an area layout change, a signal interference, or a high density of tags 309. At step 505, method 500 comprises causing, by the controller 109, an adjustment to a reader device setting 140 based on the trigger event 303 and a policy 161 associated with the trigger event 303. At step 507, method 500 may comprise recording, by the controller 109, the adjustment to the reader device setting 140 in a system setting log (e.g., antenna setting log 164, reader device setting log 167) in association with a description of the trigger event 303 and a time of the adjustment.

At step 509, method 500 may comprise instructing, by the controller 109, the reader device 111 to emit an interrogation signal in a predefined direction or read data 137 from the predefined direction in accordance with the adjustment to the reader device setting 140. At step 511, method 500 may comprise receiving, by the controller 109, the data 137 from the reader device 111 for storage at a data store 158 of the controller 109. At step 513, method 500 may comprise processing, by the controller 109, the data 137 to perform inventory tracking and management tasks based on the data 137 internally within an inventory environment 106 including the reader device 111 and the controller 109.

Method 500 may further comprise additional attributes and/or steps not explicitly shown in FIG. 5. In an embodiment, the data 137 is received from radio frequency identification signals, optical signals, or audible signals. In an embodiment, method 500 may further comprise adding, by the controller 109, additional data to one or more tags 309 in response to authenticating the controller 109. For example, the controller 109 may authenticate with the external system 123 and receive a token authenticating the controller 109 to add data to the tags 309 (e.g., identification data of a purchase of the item 306 upon which the tag 309 is attached).

In an embodiment, the adjustment to the reader device setting 140 comprises an adjustment to an angle or orientation of the reader device 111. In an embodiment, the adjustment to the reader device setting 140 comprises an adjustment to the duration of the interrogation signal. In an embodiment, the adjustment to the reader device setting 140 comprises an adjustment to a frequency band over which to emit the interrogation signal or receive the data 137. In an embodiment, the adjustment to the reader device setting 140 comprises an adjustment to a power level of the reader device 111.

FIG. 6 illustrates a computer system 700 suitable for implementing one or more embodiments disclosed herein. In an embodiment, the controller 109, antennas 114, and/or reader devices 111, etc., may each be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/ or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other nonvolatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed in an inventory system to control a plurality of antennas and a plurality of reader devices of the inventory system, comprising:

controlling, by a controller in the inventory system, a plurality of antenna settings of the antennas in the inventory system, wherein the controller is communicatively coupled to each of the antennas;

controlling, by the controller, a plurality of reader device settings of the reader devices in the inventory system, wherein the controller is communicatively coupled to each of the reader devices;

detecting, by the controller, a trigger event occurring within an area including the antennas, wherein the trigger event is based on at least one of inventory movement, an environmental change, a time of day, a security alert, a maintenance schedule, an area layout change, a signal interference, or a high density of tags;

causing, by the controller, an adjustment to at least one of the antenna settings or the reader device settings based on the trigger event and a policy associated with the trigger event;

recording, by the controller, the adjustment to the at least one of the antenna settings or the reader device settings in a system setting log in association with a description of the trigger event and a time of the adjustment; and instructing, by the controller, at least one of the antennas or the reader devices to emit an interrogation signal or read data from one or more tags in accordance with the adjustment to at least one of the antenna settings or the reader device settings.

2. The method of claim 1, wherein the adjustment to at least one of the antenna settings or the reader device settings comprises an adjustment to a direction of the plurality of the antennas to direct beams from each of the antennas to a predefined location based on the trigger event indicating the predefined location including the high density of tags.

3. The method of claim 1, wherein the adjustment to at least one of the antenna settings or the reader device settings comprises an adjustment to an output power of a subset of the antennas based on the trigger event indicating a distance between at least one of the antennas or the reader devices exceeds a predefined threshold.

4. The method of claim 1, wherein when the trigger event is based on the environmental change, the environmental change is related to a temperature or humidity detected by one or more sensors of the inventory system, and wherein the adjustment to at least one of the antenna settings or the reader device settings comprises an adjustment to a frequency band or power setting to maintain optimal read rates when operating in the temperature or humidity.

5. The method of claim 1, wherein when the trigger event is based on the inventory movement within a region of the area indicating a high density of moving tags, the adjustment to at least one of the antenna settings or the reader device settings comprises an adjustment to a frequency band or power setting to ensure all tags are read accurately.

6. The method of claim 1, wherein when the trigger event is based on the maintenance schedule, the adjustment to at least one of the antenna settings or the reader device settings comprises an adjustment to a power of one or more of the antennas to avoid interference with maintenance activities.

7. The method of claim 1, wherein when the trigger event is based on the signal interference, the adjustment to at least one of the antenna settings or the reader device settings comprises an adjustment to a frequency band or power setting to mitigate the signal interference and maintain reliable communication with the tags.

8. A method performed by a controller in an inventory system to control a plurality of reader devices of the inventory system, comprising:

detecting, by a controller in the inventory system, a trigger event occurring within an area including a reader device, wherein the trigger event is based on at least one of inventory movement, an environmental change, a time of day, a security alert, a maintenance schedule, an area layout change, a signal interference, or a high density of tags;

causing, by the controller, an adjustment to a reader device setting of the reader device based on the trigger event and a policy associated with the trigger event;

recording, by the controller, the adjustment to the reader device setting in a system setting log in association with a description of the trigger event and a time of the adjustment;

instructing, by the controller, the reader device to emit an interrogation signal in a predefined direction or read data from the predefined direction in accordance with the adjustment to the reader device setting;

receiving, by the controller, the data from the reader device for storage at a data store of the controller; and processing, by the controller, the data to perform inventory tracking and management tasks based on the data internally within an inventory environment including the reader device and the controller.

9. The method of claim 8, wherein the data is received from radio frequency identification signals, optical signals, or audible signals.

10. The method of claim 8, further comprising adding, by the controller, additional data to one or more tags in response to authenticating the controller.

11. The method of claim 8, wherein the adjustment to the reader device setting comprises an adjustment to an angle or orientation of the reader device.

12. The method of claim 8, wherein the adjustment to the reader device setting comprises an adjustment to a duration of the interrogation signal.

13. The method of claim 8, wherein the adjustment to the reader device setting comprises an adjustment to a frequency band over which to emit the interrogation signal or receive the data.

14. The method of claim 8, wherein the adjustment to the reader device setting comprises an adjustment to a power level of the reader device.

15. An inventory system, comprising:

an antenna configured to emit interrogation signals in a first direction toward one or more tags;

23

24 a reader device configured to receive data from the one or more tags; and a controller communicatively coupled to the antenna and the reader device and comprising a controller application stored on a memory, wherein the controller application, when executed by a processor, causes the controller to be configured to:

detect a trigger event occurring within an area including the antenna, wherein the trigger event is based on at least one of inventory movement, an environmental change, a time of day, a security alert, a maintenance schedule, an area layout change, a signal interference, or a high density of tags;

cause an adjustment to at least one antenna setting of the antenna or at least one reader device setting of the reader device based on the trigger event and a policy associated with the trigger event; and instruct the antenna or the reader device to emit an interrogation signal in a direction of one or more tags and read data from the one or more tags in accordance with the adjustment to the at least one antenna setting or the at least one reader device setting.

16. The inventory system of claim 15, wherein the policy indicates an association between the trigger event and the adjustment.

17. The inventory system of claim 15, further comprising one or more sensors configured to detect the environmental change.

18. The inventory system of claim 15, further comprising a security application configured to detect security alerts based on security threats within the area, and wherein the controller application is further configured to receive the security alert from the security application.

19. The inventory system of claim 15, wherein the data is received from radio frequency identification signals, optical signals, or audible signals.

20. The inventory system of claim 15, further comprising at least one mini-tower.

* * * * *